United States Patent [19]

Moser et al.

[11] Patent Number: 5,260,045
[45] Date of Patent: Nov. 9, 1993

[54] MODIFICATION OF MAGNESIUM-ENHANCED LIME FLUE GAS DESULFURIZATION PROCESS TO IMPROVE SOLIDS DEWATERING

[75] Inventors: Robert E. Moser, Palo Alto, Calif.; James H. Wilhelm, Sandy, Utah; John Burke, Chamblee, Ga.; Sterling Gray, Louisville, Ky.

[73] Assignee: Electric Power Research Institute, Palo Alto, Calif.

[21] Appl. No.: 796,603

[22] Filed: Nov. 22, 1991

[51] Int. Cl.$^5$ .................... C01B 17/00; C01B 17/22
[52] U.S. Cl. .................... 423/243.09; 423/243.08
[58] Field of Search .......... 423/242 A, 244 A, 244 R, 423/242 R, 243.08, 243.09

[56] References Cited

U.S. PATENT DOCUMENTS

| | | | |
|---|---|---|---|
| 3,873,275 | 3/1975 | Bennett | 23/273 R |
| 3,914,378 | 10/1975 | Selmeczi | 423/242 |
| 3,919,393 | 11/1975 | Selmeczi | 423/242 |
| 3,919,394 | 11/1975 | Selmeczi | 423/242 |
| 4,294,807 | 10/1981 | Randolph | 423/242 |
| 4,996,032 | 2/1991 | Stowe et al. | 423/243.09 |
| 5,039,499 | 8/1991 | Stowe | 423/243.09 |

Primary Examiner—Gregory A. Heller
Attorney, Agent, or Firm—Sixbey, Friedman, Leedom & Ferguson

[57] ABSTRACT

An improved wet magnesium-enhanced lime flue gas desulfurization system and process are provided. The magnesium-enhanced lime slurry process for removing sulfur dioxide from flue gas to produce gas that is substantially free from sulfur dioxide and calcium and sulfite-containing waste solids is modified to include the addition of process reagents to a separate premix slurry tank which has a controlled, high pH. The addition of slurry formed from the scrubber effluent to the premix slurry tank is controlled to maintain the pH above 10. The premix slurry tank mixture is circulated to a reaction tank for reaction with the scrubber effluent to produce large crystal, easily dewatered waste solids.

8 Claims, 3 Drawing Sheets

MODIFICATION OF MAGNESIUM-ENHANCED LIME FLUE GAS DESULFURIZATION PROCESS TO IMPROVE SOLIDS DEWATERING

TECHNICAL FIELD

The present invention relates generally to a process for removing sulfur dioxide from flue gas and specifically to improvements to an existing magnesium-enhanced lime flue gas desulfurization process to improve solids dewatering.

BACKGROUND OF THE INVENTION

The desulfurization of flue gas, particularly flue gas from power plants, has been the subject of considerable study. Air quality laws, both at the federal and state level, have set increasingly stringent emissions standards, especially for such known pollutants as sulfur oxides. Because coal and oil-fired electric power generating plants can discharge large quantities of sulfur oxides as combustion by-products, much effort has focused on the desulfurization of flue gas to reduce power plant sulfur dioxide emissions to permissible levels.

Substantial effort has been expended to develop a flue gas desulfurization process which removes substantially all of the sulfur dioxide from the flue gas. Although existing desulfurization process chemistries have achieved high sulfur dioxide removal, these processes have also created other environmental problems. One particularly notable environmental problem to be solved is the disposal of the large quantities of solids produced by the most widely used flue gas desulfurization processes. In the past, flue gas desulfurization by-product solids have been dumped in landfills. However, available landfill space is rapidly diminishing and will not be able to accommodate the disposal of flue gas desulfurization process waste solids if they continue to be generated at the current rate.

One of the available processes for removing sulfur dioxide from flue gas has a high effective sulfur dioxide removal rate. This process, variations of which are disclosed in U.S. Pat. Nos. 3,914,378; 3,919,393 and 3,319,394 to Selmeczi, is a wet scrubbing process which uses magnesium and lime to precipitate sulfur oxides in the flue gas as calcium sulfite and calcium sulfate solids. A slurry is used as the scrubbing medium, and lime is added directly to the scrubbing slurry to precipitate calcium salts. The calcium sulfates and sulfites are precipitated in the presence of soluble magnesium. These solids form a sludge retains relatively large amounts of water and thus is difficult to dispose of. Consequently, this process is a costly way to desulfurize flue gas.

Although the magnesium-enhanced lime flue gas desulfurization process disclosed in the aforementioned patents effectively removes sulfur dioxide from flue gas, the poor quality of the calcium sulfite solids produced has been a major drawback to the use of this process. A significant aspect of the magnesium-enhanced lime scrubbing process is that magnesium must be kept at 3000-8000 ppm in the liquid phase to achieve the high $SO_2$ removals desired. The soluble magnesium carries with it high concentrations of sulfites and sulfates. The magnesium and sulfates act as crystal habit modifiers, and the calcium sulfite crystals formed are relatively small, needlelike and fragile. As a result, the attrition of these fragile crystals that occurs as they are recirculated through the absorber produces fine solids that dewater at low rates and retain more water than the solids generated by lime or limestone flue gas desulfurization processes. Large thickeners and filters are required to dewater the solids, and the waste disposal problem is costly. In addition, the use of a slurry as the scrubbing medium produces deposits of solids in the quiescent areas of the scrubbing system. The slurry solids also cause abrasion on the pumps, piping nozzles and other system components.

The prior art has proposed a system for removing solids in a wet lime or limestone flue gas desulfurization system which changes crystal size and habit by feeding spent scrubbing liquor to agitated and quiescent crystallization zones in the presence of a crystal habit modifier in U.S. Pat. No. 4,294,807 to Randolph. The system described by Randolph does improve solids dewatering when lime is used for scrubbing. However, this system employs a very different chemistry from a magnesium-enhanced lime flue gas desulfurization process and will not necessarily solve the solids dewatering problem. For example, additives designed to enhance sulfur dioxide removal or control scale in a lime or limestone flue gas desulfurization process are lost by coprecipitation with the product solids in a magnesium-enhanced lime flue gas desulfurization process. There is no suggestion in this patent, moreover, that the crystallization system described therein would improve solids quality or dewatering in any flue gas desulfurization process other than one based on lime or limestone.

The prior art, therefore, has failed to provide a wet magnesium-enhanced lime flue gas desulfurization system or process that effectively improves both the properties and the dewatering characteristics of the solids produced by this process. Consequently, there is a need for a magnesium-enhanced lime flue gas desulfurization system and process which produce both a high sulfur dioxide removal efficiency and easily dewatered and disposed of waste solids.

SUMMARY OF THE INVENTION

It is a primary object of the present invention, therefore, to overcome the disadvantages of the prior art and to provide a wet magnesium-enhanced lime flue gas desulfurization system and process which produces improved quality, easily dewatered solids.

It is another object of the present invention to provide an effective modification to an existing magnesium-enhanced lime flue gas desulfurization system to control solids properties.

It is a further object of the present invention to provide a magnesium-enhanced lime flue gas desulfurization process wherein sulfites and sulfates are precipitated in an environment with little soluble magnesium.

It is a still further object of the present invention to provide a magnesium-enhanced lime flue gas desulfurization process characterized by lower dewatering energy costs.

The foregoing objects are achieved by providing modifications to a wet magnesium-enhanced lime flue gas desulfurization system wherein flue gas sulfur dioxide is scrubbed from the flue gas in a scrubber in the presence of a slurry containing soluble magnesium and lime. The present invention adds a premix slurry tank (PMST) to the system. The PMST, which receives the magnesium and lime reagents, is fed with recirculated scrubbing slurry and is maintained at a high pH, improves conditions for crystal growth and, therefore, solids formation. Magnesium is caused to precipitate in the premix slurry tank as magnesium hydroxide and thus does not adversely affect the formation of calcium precipitates. Calcium sulfite and sulfate concentrations in the thickener are reduced to produce more easily dewatered sludge particles.

Additional objects and advantages will be apparent form the following description, claims and drawings.

DESCRIPTION OF THE PREFERRED EMBODIMENTS

Flue gas desulfurization (FGD) systems that employ magnesium-enhanced lime for sulfur removal have proven to be very reliable and capable of removing large percentages of sulfur at the liquid-to-gas ratios typically encountered in these systems. However, the waste solids produced by magnesium-enhanced lime flue gas desulfurization systems are difficult to dewater. As a result, what would otherwise be an effective flue gas sulfur dioxide removal process can be quite expensive because of the additional equipment required for the process and the increased disposal costs of a low solids concentration waste. The poor solids dewatering properties in the available magnesium-enhanced lime flue gas desulfurization systems are most likely to arise from two conditions, the production of fragile crystals and the breakage of these crystals. The return of the scrubber effluent to the high pH reaction tank causes locally high calcium sulfite relative saturations, which, in the presence of soluble magnesium and sulfate, produces very fragile needle-like crystals. The recirculation of these very fragile crystals through the absorber or scrubber recycle pumps causes the crystals to break and form even finer particles. The dewatering of such fine particles is not easily accomplished. As a result, the waste solids from available systems must be disposed of with all of the water that cannot be removed.

The flue gas desulfurization system and process of the present invention represents a significant and substantial improvement over known magnesium-lime flue gas desulfurization processes. The system and process produces large crystals that do not break as easily and are easily separated out of solution. Solids dewatering is greatly simplified with the present process. Magnesium-containing lime is mixed with slurry and added to the reaction tank from a separate high pH premix slurry tank. The premix slurry tank environment improves conditions for crystal growth and is maintained at a high pH to ensure that the calcium sulfites and sulfates are precipitated in an environment with little or no soluble magnesium, which can have an adverse effect on crystal size and growth.

Figure 1A:
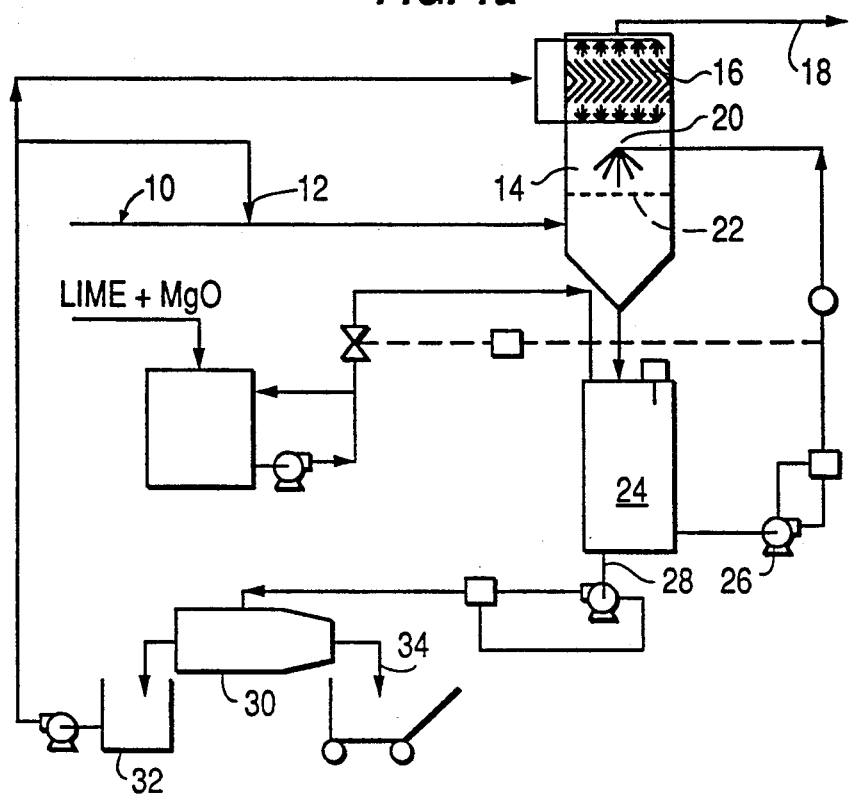
FIG. 1a is a schematic illustration of one prior art magnesium-enhanced lime flue gas desulfurization system.

Referring to the drawings, FIG. 1a illustrates schematically a known magnesium-enhanced lime flue gas desulfurization process. Flue wet gas from a power generating plant (not shown) enters the system at 10, is saturated by service or process water at arrow 12, is directed to a countercurrent spray tower 14, passes through a vertical mist eliminator 16 and then exits the system at 18. Gas/liquid contact in the tower is provided by a single spray header 20 and a tray 22. The exit temperature of the flue gas is controlled by heating the inlet flue gas. Absorber or scrubber effluent slurry flows by gravity to a reaction tank 24. Some of this slurry is pumped to the spray header 20 by a pump 26. Slurry solids concentration is controlled by blowing down a waste stream 28 to a horizontal centrifuge or filter 30. The resulting centrate liquor is pumped from a centrate tank 32 to be used for flue gas quench and mist eliminator wash. The reaction tank level is controlled by the addition of make-up water. System pH is controlled by reagent addition to the reaction tank 24. Reagent addition rate is controlled by a feedback control signal. Waste solids dewatered by the centrifuge or filter are discharged at 34. The waste solids concentration for the FIG. 1a system may vary from 40 to 60 wt %, and the centrate liquor generally contains about 400 ppm solids.

Figure 1B:
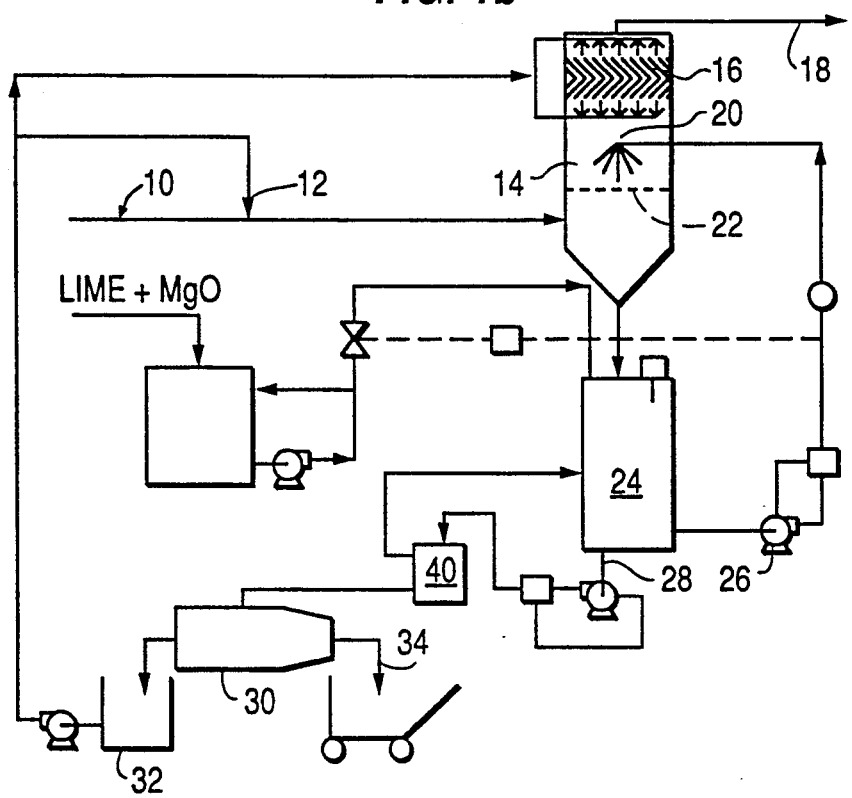
FIG. 1b is a schematic illustration of a second prior art magnesium-enhanced lime flue gas desulfurization system.

FIG. 1b illustrates the same magnesium-enhanced lime flue gas desulfurization process shown in FIG. 1a with the exception of the addition of a thickener 40. The centrate liquor in this system contains very fine solids. Returning these fine solid particles to scrubber prevents their recovery and dewatering. The thickener 40 reduces the volume of centrate liquor by concentrating the waste to 15 wt % from 4 wt %. A polymer flocculent added to the thickener feed ensures good settling, which does not occur if the flocculent is added after the waste solids have been separated by the centrifuge. However, even the addition of the thickener has not solved the dewatering problems in this magnesium-enhanced lime FGD system.

The scrubbing medium for the foregoing systems is a slurry, and lime is added directly to the scrubbing slurry to precipitate calcium salts. The calcium sulfates and sulfites are precipitated in the presence of soluble magnesium which modifies the crystals to produce solids that retain water and are thus difficult to dewater.

Figure 2:
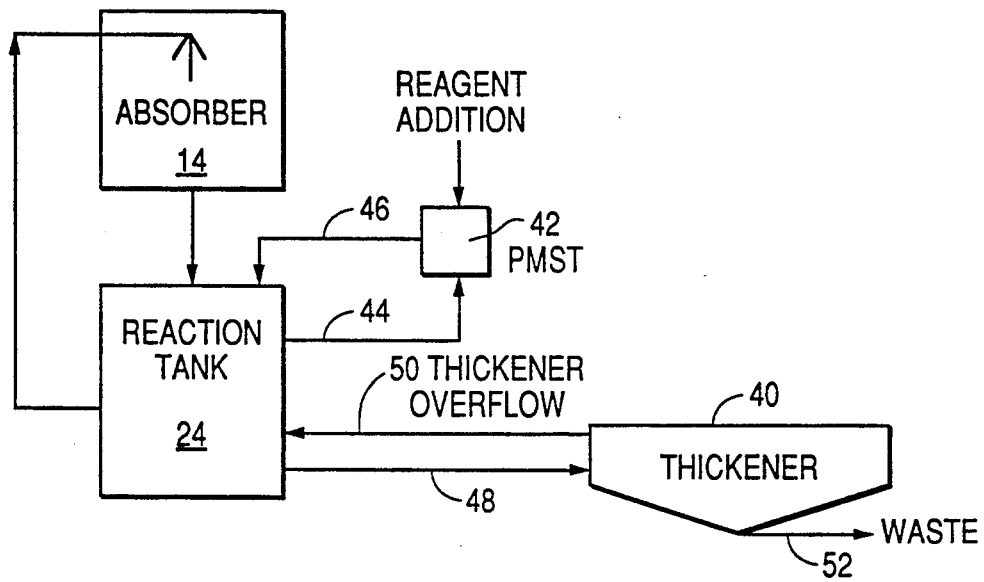
FIG. 2 schematically represents one magnesium-enhanced lime flue gas desulfurization system configuration according to the present invention.
Figure 3:
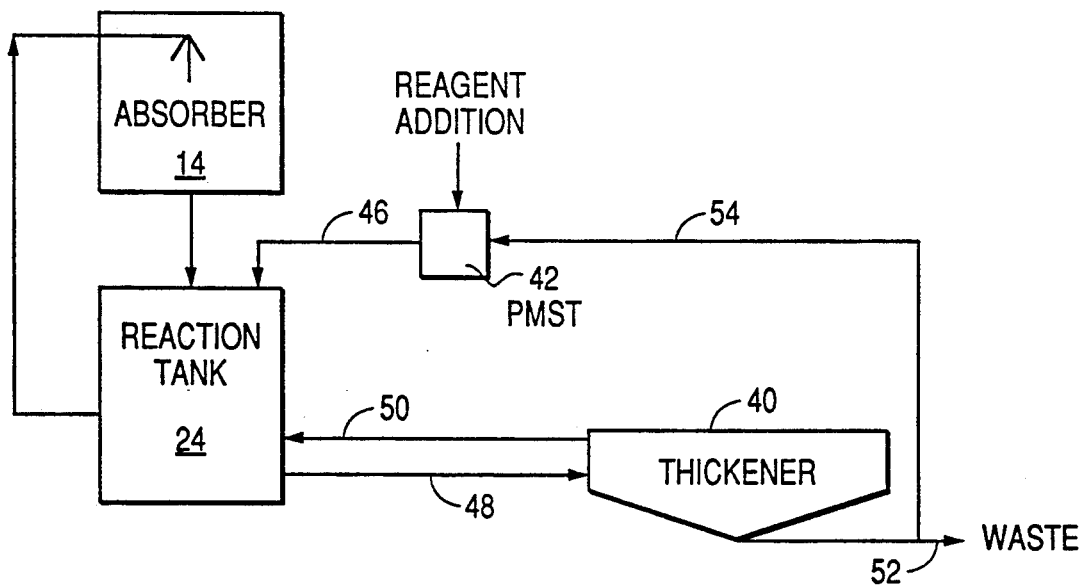
FIG. 3 schematically represents a second magnesium-enhanced lime flue gas desulfurization system according to the present invention.

The magnesium-enhanced lime FGD system and process of the present invention produce significant improvements in solids dewatering over the aforementioned prior art magnesium-enhanced lime FGD system and processes. The FGD system shown in FIGS. 1a and 1b was modified as illustrated in FIGS. 2 and 3. A high pH premix slurry tank (PMST) 42 was added to the system to permit more control over the crystallization environment.

The premix slurry tank 42 is essentially a crystallizer and reagent addition tank. Reagent is combined with a slurry stream 44 in the premix slurry tank 42 where addition conditions can be precisely controlled to exert maximum influence over the crystallization environment. The location of the PMST is shown in detail in FIGS. 2 and 3.

The growth patterns and shapes of the crystal solids in a magnesium-enhanced lime flue gas desulfurization system are affected significantly by the crystallization environment. The presence of magnesium and sulfate adversely affect calcium sulfite crystal formation. In addition, the pH may negatively influence crystal formation. Consequently, the pH of the PMST environment is carefully controlled by controlling the amount of slurry added with the magnesium and lime reagents. The pH of the PMST must be kept in the range of 9.5-12, preferably above 10, to precipitate all of the magnesium as $Mg(OH)_2$, thereby removing the negative effects of soluble magnesium on calcium sulfite crystal growth from the crystallization environment and allowing crystal growth in a magnesium-free environment. Maintaining the pH at this level also reduces sulfite and sulfate concentration in the crystallizer which results in the production of solids that are more easily dewatered. The pH of the PMST may be controlled by varying the recycle flow rate.

Recycle slurry to the PMST can be formed from scrubbing slurry or the thickener underflow, as shown in FIGS. 2 and 3. To maximize mixing, reagent and recycle slurry is preferably introduced at the bottom of the tank when the effluent is taken from the top.

FIG. 2 illustrates one system configuration whereby an existing magnesium-enhanced lime flue gas desulfurization system is modified according to the present invention. In this configuration reagent is added directly to a premix slurry tank 42. Fluid connections between the premix slurry tank (PMST) 42 and the reaction tank 24 are provided so that slurry from the reaction tank can circulate through line 44 to the premix slurry tank. Reagents are added to the premix slurry tank and mixed with the reaction tank slurry under controlled crystallization conditions. The slurry-reagent mix then flows through line 46 to the reaction tank to react with the scrubber effluent. Reaction tank solids flow to the thickener 40 through line 48, and thickener overflow is directed back to the reaction tank along line 50. Waste solids are discharged at 52.

FIG. 3 illustrates a second modification of an existing magnesium-enhanced lime flue gas desulfurization system according to the present invention. In this process configuration slurry is circulated from the thickener to the premix slurry tank through line 54 instead of from the reaction tank. The amount of slurry added to the PMST, from whatever source, in combination with the reagent in the PMST will control the pH. The pH is kept high, preferably above 10, to precipitate the magnesium as magnesium hydroxide and allow crystal growth in a magnesium-free environment. The growth patterns and resulting shape of the crystals are positively influenced by this environment to produce calcium sulfite solids that are large and easily dewatered.

The primary objective of the present invention is to produce larger, more easily dewatered calcium/sulfite waste crystals in a magnesium-enhanced lime flue gas desulfurization system. In the magnesium-enhanced lime flue gas desulfurization system, increasing the average crystal size can be achieved by increasing the residence time of the crystals in the system or by decreasing the nucleation rate. Increasing crystal residence time in this type of flue gas desulfurization system would require larger tanks, higher solids concentrations or decreased $SO_2$ removal. Neither increasing the tank size nor decreasing $SO_2$ removal is a desirable option, especially since high $SO_2$ removal is a major advantage of the magnesium-enhanced lime flue gas desulfurization process. Moreover, although increasing the solids concentration would increase residence time, it would also significantly increase contact nucleation and, consequently, the production of difficult to dewater solids. As a result, decreasing nucleation, rather than increasing crystal residence time, was selected for increasing the crystal size distribution in the magnesium-enhanced lime flue gas desulfurization system of the present invention.

Reduction in secondary nucleation and attrition are the primary mechanisms by which crystal size is increased in the present process. Since secondary nucleation, and possibly attrition as well, increase to some extent as crystal size increases, a substantial reduction in relative saturation, density or agitation are required to increase crystal size in the magnesium-enhanced lime flue gas desulfurization system. It is necessary to maximize residence time of the fines in this system while minimizing needle breeding and contact nucleation. Slurry solids concentration is a key variable in this system. In addition, identification of the kind of nucleation mechanism that is the most important in the magnesium-enhanced lime flue gas desulfurization process is necessary to determine the operating conditions that will minimize or avoid nucleation or needle breeding. If contact nucleation and attrition are the primary nucleation mechanism, solids concentration can be decreased. However, this would result in a higher relative saturation and an increased risk of needle breeding. If needle breeding is a dominant contributor, the relative saturation must be decreased by increasing the solids concentration. Some of the gain in this case, however, will be countered by increased contact nucleation.

The magnesium-enhanced lime flue gas desulfurization process of the present invention was evaluated and compared to a known magnesium-enhanced lime flue gas desulfurization process to study process chemistry, solids concentration, the use of a premix slurry tank, residence time and agitator speed as they related to the improvement of waste solids.

A series of preliminary evaluations produced the following observations about the present process:

Inhibited oxidation stabilized system operation and resulted in improved solids properties. Oxidation was held at less than 8% by the addition of 1000 ppm thiosulfate in the liquor during the preliminary evaluation. Inhibiting the oxidation increases the dissolved sulfite concentration at a constant magnesium concentration because of a shift in the sulfate-to-sulfite ratio. $SO_2$ removal is improved under these conditions in a system that is not gas-film limited. If $SO_2$ removal in a system is already adequate, inhibiting oxidation may allow a reduction in the liquid-to-gas ratio (L/G) or, in some cases, a larger flue gas bypass flow.

The use of a premix slurry tank improved solids properties, even when the PMST volume was reduced and the residence time decreased.

Operating variables and waste solids characterizations results were studied to evaluate the magnesium-enhanced lime flue gas desulfurization process of the present invention. This testing involved setting the equipment configurations, starting the systems up with specified operating parameters, adjusting chemistry as needed, operating for three solid phase residence times, and sampling product slurry and other process streams. Temperatures, pressures, flow rates, $SO_2$ removal and other process data were collected. Table I sets forth the schedule of collection for analysis of liquor, solid and slurry samples.

TABLE I

| STREAM SAMPLED | LINE-OUT-PERIOD | FINAL SAMPLE PERIOD |
|---|---|---|
| Scrubbing Slurry | AM: pH, Temp, Wt % <br> PM: pH, Temp, Wt % | AM: pH, Temp, Wt % <br> Pm: pH, Temp, Wt % |
| Scrubbing Liquor | AM: SO3, S2O3, Mg <br> PM: SO3, S2O3 | AM: Ca, Mg, Na, SO3, SO4, CO3, Cl, S2O3 |
| Absorber Effluent | AM: pH, Temp | AM: pH, Temp |
| Centrifuge Product | AM: Wt % <br> PM: Wt % | AM: Wt % <br> PM: Wt % |
| PMST Liquor | AM: pH <br> PM: pH | AM: pH, SO3, Mg, SO4, CO3, CA <br> PM: pH, SO3, Mg, SO4, CO3, Ca |

(2) Scrubbing slurry at 4 wt %

TABLE II

| TEST | pH | Mg mM | SO3 mM | S2O3 mM | CCRT Underflow wt % | Polymer | Premix tank | PMST Residence Time min | Premix Agitator RPM | CCRT Agitator RPM | Thickener Unit Area ft2·day/ton | Filtration Rate lb/hr·ft2 | Filter cake wt % |
|---|---|---|---|---|---|---|---|---|---|---|---|---|---|
| MGLIM-9 | 6.5 | 125 | 68 | 8.8 | 4(2) | YES | NO | | | | 22 | 383 | 45 |
| MGLIM-9R | 6.5 | 136 | 69 | 7.8 | 4 | YES | NO | | | | 28 | 731 | 41 |
| MGLIM-10 | 6.5 | 128 | 77 | 8.0 | 4 | YES | YES | 15 | 680 | | 11 | 677 | 47 |
| MGLIM-11 | 6.5 | 132 | 68 | 8.7 | 4 | YES | YES | 15 | 680 | | 11 | 1170 | 48 |
| MGLIM-12 | 6.5 | 127 | 69 | 41.0 | 4 | YES | NO | | | | 25 | 730 | 43 |
| MGLIM-12A | 7 | 123 | 47 | 41.0 | 4 | YES | NO | | | | 29 | 840 | 41 |
| MGLIM-13 | 6.5 | 125 | 74 | 35.0 | 4 | YES | YES | 15 | 680 | | 10 | 930 | 47 |
| MGLIM-13A | 7 | 129 | 65 | 40.0 | 4 | YES | YES | 15 | 680 | | 12 | 650 | 46 |

In addition, solids properties were evaluated using a settling test, a filter leaf test and a centrifuge product solids concentration test.

The settling test results were designed to provide an estimate of the unit area (UA) required to thicken a slurry to a given concentration. UA is defined as follows:

$$UA(\text{ft}_2 \cdot \text{day/ton}) = t/(C \cdot H)$$

where t = days required for slurry to reach target concentration
C = initial solids concentration (tons/ft$^3$); and
H = height of test column (ft).

The target concentration was 30 wt %, which represents a minimum concentration that would be typical for an electric utility company's flue gas desulfurization thickener application. The UA values presented herein are relative values.

The filter leaf test results provide information about the expected performance of a rotary drum or disc vacuum filter with the tested slurry. Filter cake solids concentration was also determined. The time required for a given sample of slurry to be filtered was measured. The form filtration rate (FFR) is defined to be:

$$FFR(\text{lb/ft}^2 \cdot \text{hr}) = Ws/(t \cdot A)$$

where:
t = time to form the cake (hr)
Ws = weight of solids filtered (lb); and
A = area of test filter (ft$^2$)

The cake solids concentration (wt %) was found by drying and weighing the cake from the filter leaf test to determine its solids content.

The product slurry from the centrifuge was also analyzed for solids content. The centrifuge product solids concentration (CP) can provide a good indication of waste solids quality. The possibility of inconsistent centrifuge operation precludes the use of this characteristic as an analytical measurement, however.

Table II summarizes operating variables and waste solids characterization results for a series of tests conducted to evaluate the magnesium-enhanced lime flue gas desulfurization process of the present invention and to compare this process to a known magnesium-enhanced lime flue gas desulfurization process.

Tests MGLIM-9 and MGLIM-9R, which evaluate the system configuration shown in FIG. 1a, were used as baseline slurry configuration tests.

Because of the potentially adverse effects of magnesium, sulfate and sulfite, as discussed above, on crystal growth and solids dewatering properties, an objective of the magnesium-enhanced lime flue gas desulfurization system of the present invention is to create an environment for crystal growth that is substantially free of magnesium, sulfate and sulfite. The creation of such an environment requires raising the pH to a high alkaline level within the range of 9.5–12 and preferably above 10. The pH is controlled by adjusting the recycle flow through the premix slurry tank to the reaction tank. This recycle flow may also come from the thickener underflow and can also be adjusted by adjusting the feed rate to the centrifuge. For most of the tests evaluating the PMST, the recycle flow rate was 2 gpm with 15 wt % solids. These conditions resulted in the precipitation of about one-third of the sulfite in the PMST.

Figure 4A:
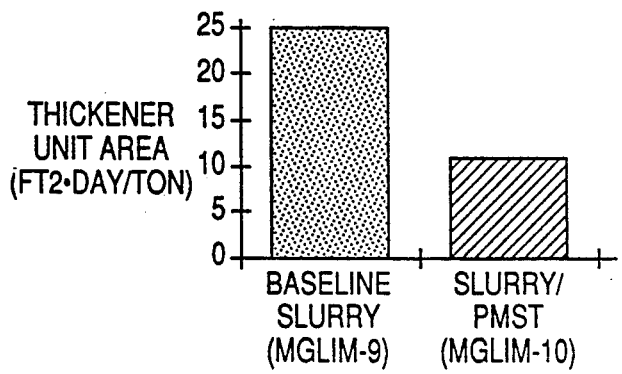
FIG. 4(a), (b), and (c) illustrate graphically a comparison of the solids properties produced by a prior art magnesium-enhanced lime flue gas desulfurization system and by the modified magnesium-lime flue gas desulfurization system configuration of the present invention.
Figure 4C:
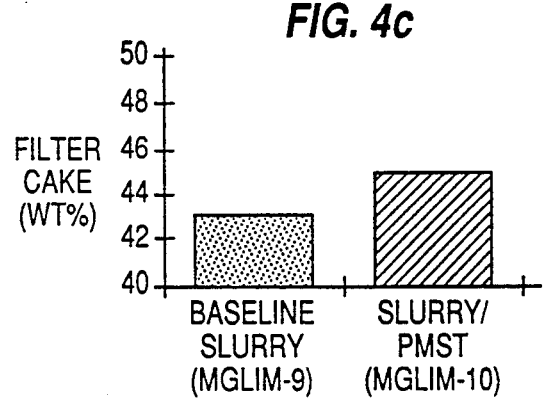
Figure 4B:
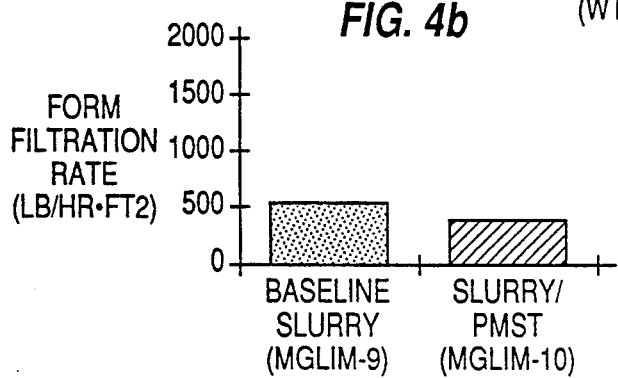

FIG. 4 illustrates the improvements in solids properties produced when a magnesium-enhanced lime flue gas desulfurization system configuration includes and a premix slurry tank (PMST). The thickener unit area (UA), filter cake, and filtration rate were all significantly better with the PMST than in the slurry baseline test (MGLIM-9). The PMST modifies crystal habit, which may affect crystal shape and susceptibility to breakage.

The effects of magnesium and sulfite on the process chemistry of the magnesium-enhanced lime flue gas desulfurization process were studied. Increasing the magnesium concentration of the scrubbing liquor produces an increase in the UA and a decrease in the filter cake solids content. The magnesium here either acts like a crystal habit modifier, coprecipitates in the sulfur matrix, or both, which results in a decline in waste solids properties.

Sulfite, however, affected waste solids properties differently. Initially, as the sulfite was increased, the UA increased, most likely because the solids residence time is shorter due to increased SO$_2$ removal or crystal habit modifier effects of the sulfite. However, when the sulfite was increased above 70 mM, the UA decreased.

Increase of the sulfite above about 70 mM does not increase SO$_2$ removal since the system is gas-film limited. However, as the liquor sulfite concentration increases, the fraction of sulfite precipitated in the PMST also increases. For example, if 1.4 moles/min of $SO_2$ is absorbed at 70 mM sulfite with a PMST feed flow rate of 2 gpm, 38% of the sulfite will precipitate in the PMST. Increase of the sulfite to 140 mM may increase $SO_2$ only to about 1.6 mole/min. At the same feed rate, 66% of the sulfite will be precipitated in the PMST. The more sulfite that is precipitated in the PMST, the better the properties of the waste solids will be.

When the filter cake solids were evaluated as the sulfite concentration was increased, no difference in weight % of the filter cake solids was noted when the PMST was included in the process configuration as compared to when it was not included. In addition, sulfite concentrations above 70 mM did not change the filter cake solids.

Figure 5:
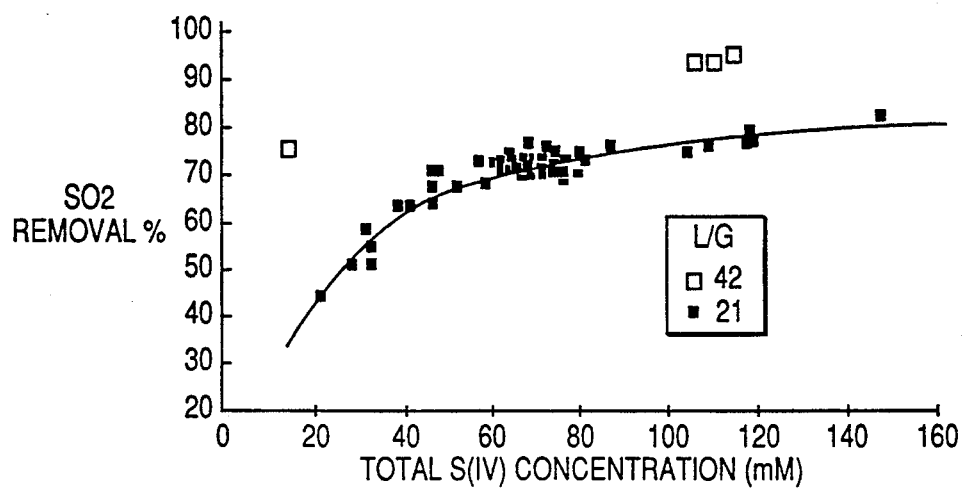
FIG. 5 illustrates, graphically, the relationship between $SO_2$ removal and sulfite concentration at two L/G ratios.

$SO_2$ removal efficiency was determined to depend on dissolved sulfite concentration. FIG. 5 illustrates the relationship between $SO_2$ removal and sulfite concentration. At about 80 mM of sulfite, the improvement in removal observed with increasing sulfite concentration begins to diminish. At this concentration the liquid-phase alkalinity is sufficiently high that the transfer of $SO_2$ through the gas-film is the limiting step in $SO_2$ removal. Tests at a pH of about 7 confirmed this. At this pH, the sulfite-bisulfite equilibrium shifts toward sulfite, increasing the liquid phase alkalinity. However, the $SO_2$ removal was not higher.

FIG. 5 demonstrates that the three tests run at a liquid gas ratio (L/G) of 42 resulted in higher $SO_2$ removals for a given sulfite concentration. Increasing L/G increases the gas/liquid contact area and increases the maximum attainable removal. $SO_2$ removal efficiency was affected by the mass transfer characteristics of the spray tower and the liquid phase alkalinity of the liquor.

The magnesium-enhanced lime flue gas desulfurization system and process of the present invention dramatically improves the dewatering characteristics of the solids produced. These improvements, particularly the improvements in settling characteristics, should decrease significantly capital and operating costs of magnesium-enhanced flue gas desulfurization systems incorporating them. Although the economies of this system will perhaps be most effectively realized in the construction of new flue gas desulfurization systems, existing systems can be modified to incorporate the PMST of the present invention.

INDUSTRIAL APPLICABILITY

The magnesium-enhanced lime flue gas desulfurization system and process of the present invention will find its primary use in connection with electric power generating plants using sulfur-containing fuels that produce flue gases that must be scrubbed to remove the sulfur oxides prior to discharge into the environment. However, the novel process and system of the present invention will also be useful in connection with the removal of sulfur oxides from any industrial process when it is desired to produce larger, more easily dewatered calcium and sulfur-containing waste solid crystals.

We claim:

1. A wet magnesium-enhanced lime flue gas desulfurization process for scrubbing sulfur dioxide from sulfur dioxide-containing flue gas to produce substantially sulfur dioxide-free gas for discharge into the environment and easily dewatered large crystal waste solids, wherein said process includes the steps of:
    (a) wet scrubbing said flue gas in a scrubber under inhibited oxidation conditions and directing effluent from the scrubber to a reaction tank to form a slurry;
    (b) adding aqueous sulfur-removing magnesium and lime-containing reagents to a premix slurry tank containing a portion of the reaction tank slurry at a pH sufficiently highly alkaline to cause substantially all of the soluble magnesium to precipitate, thereby forming a liquid fraction free from soluble magnesium and a slurry fraction containing said magnesium precipitate and calcium sulfite solids;
    (c) directing slurry from the reaction tank to the premix slurry tank and mixing the slurry with the magnesium-free liquid fraction and the premix slurry tank slurry fraction at said highly alkaline pH;
    (d) circulating the premix slurry tank slurry fraction to the reaction tank;
    (e) reacting the premix slurry tank slurry fraction with the scrubber effluent in the reaction tank to produce additional, larger crystal calcium and sulfite-containing waste solids;
    (f) dewatering the waster solids to recover solids for disposal and a liquid fraction for use in the wet scrubbing step; and
    (g) circulating the reaction tank slurry to the scrubber.

2. The wet magnesium-enhanced lime flue gas desulfurization process of claim 1, further including the steps of prior to step (f), circulating the reaction tank solids fraction to a thickener to produce waste solids for dewatering and directing thickener overflow to the reaction tank.

3. The wet magnesium-enhanced lime flue gas desulfurization process described in claim 2, wherein waste solids from the thickener are circulated to the premix slurry tank.

4. The wet magnesium-enhanced lime flue gas desulfurization process described in claim 1, wherein the amount of slurry directed to the premix slurry tank is controlled to maintain the pH of the mixture in the premix slurry tank at a pH in the range of 9.5–12.

5. The wet magnesium-enhanced lime flue gas desulfurization process described in claim 4, wherein the pH is maintained at a pH above 10.

6. The wet magnesium-enhanced lime flue gas desulfurization process described in claim 1, wherein the mixture in step (e) is agitated during the reaction.

7. The wet magnesium-enhanced lime flue gas desulfurization process described in claim 5, wherein an oxidation inhibiting reagent is added to the premix slurry tank.

8. The wet magnesium-enhanced lime flue gas desulfurization process described in claim 5, wherein the pH is maintained over 10 to precipitate magnesium as $Mg(OH)_2$.

* * * * *